(12) United States Patent
Takahashi

(10) Patent No.: US 7,149,908 B2
(45) Date of Patent: Dec. 12, 2006

(54) CONTROL METHOD OR UNIT OF A DATA TRANSMISSION APPARATUS CONTROLLING THE ELECTRIC POWER SUPPLIED TO ALL OF THE INTERFACE SECTIONS

(75) Inventor: Masafumi Takahashi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 187 days.

(21) Appl. No.: 10/489,912

(22) PCT Filed: Sep. 19, 2002

(86) PCT No.: PCT/JP02/09613

§ 371 (c)(1),
(2), (4) Date: Mar. 18, 2004

(87) PCT Pub. No.: WO03/028339

PCT Pub. Date: Apr. 3, 2003

(65) Prior Publication Data

US 2004/0240467 A1    Dec. 2, 2004

(30) Foreign Application Priority Data

Sep. 21, 2001 (JP) .............................. 2001-289901

(51) Int. Cl.
*G06F 1/26* (2006.01)
(52) U.S. Cl. ..................... 713/320; 713/323; 713/320
(58) Field of Classification Search ................ 713/100, 713/300, 331, 320, 323, 330
See application file for complete search history.

(56) References Cited

U.S. PATENT DOCUMENTS 5,971,978 A * 10/1999 Mukai ........................ 606/18
6,034,504 A * 3/2000 Holcomb .................... 320/110
6,366,143 B1 * 4/2002 Liu et al. .................... 327/142
6,554,490 B1 * 4/2003 Sumi et al. ................... 385/88

FOREIGN PATENT DOCUMENTS

| JP | 10-233791 A | 9/1998 |
| JP | 11-88458 A | 3/1999 |
| JP | 2000-180663 A | 6/2000 |
| JP | 2000-188623 A | 7/2000 |
| JP | 2000267770 A * | 9/2000 |
| JP | 2000-340306 A | 12/2000 |
| JP | 2001-42975 A | 2/2001 |
| JP | 2001-86131 A | 3/2001 |
| JP | 2002032159 * | 1/2002 |

* cited by examiner

*Primary Examiner*—Thomas Lee
*Assistant Examiner*—Suresh K Suryawanshi
(74) *Attorney, Agent, or Firm*—Birch, Stewart, Kolasch & Birch, LLP

(57) ABSTRACT

A data transmission apparatus includes a plurality of I/F (interface) units for converting data into a predetermined transmission format and transmitting it to an external device, a power source section for supplying electric power to the I/F sections, a control section for controlling the power source section, and detection sections are connected to the I/F units for outputting connection detecting signals to the control section. The control section outputs a power control signal to the power source section so as to operate in such a manner that when the control section has detected that at least one of the I/F sections is in a connecting state, the electric power is supplied to the I/F sections, and when the control section has detected that none of the I/F sections is in a connecting state, no electric power is supplied from the power source section to the I/F sections.

16 Claims, 11 Drawing Sheets

FIG. 3

| 103a | 103b | 103c | 102 |
|------|------|------|-----|
| 0 | 0 | 0 | 0 |
| 1 | 0 | 0 | 1 |
| 0 | 1 | 0 | 1 |
| 1 | 1 | 0 | 1 |
| 0 | 0 | 1 | 1 |
| 1 | 0 | 1 | 1 |
| 0 | 1 | 1 | 1 |
| 1 | 1 | 1 | 1 |

FIG. 5

| 103a | 103b | 103c | 102 | 110a | 110b | 110c |
|------|------|------|-----|------|------|------|
| 0 | 0 | 0 | 0 | 0 | 0 | 0 |
| 1 | 0 | 0 | 1 | 1 | 0 | 0 |
| 0 | 1 | 0 | 1 | 0 | 1 | 0 |
| 1 | 1 | 0 | 1 | 1 | 1 | 0 |
| 0 | 0 | 1 | 1 | 0 | 0 | 1 |
| 1 | 0 | 1 | 1 | 1 | 0 | 1 |
| 0 | 1 | 1 | 1 | 0 | 1 | 1 |
| 1 | 1 | 1 | 1 | 1 | 1 | 1 |

FIG. 7

| 103a | 103b | 103c | 102 | 110a | 110b | 110c | 120 |
|------|------|------|-----|------|------|------|-----|
| 0    | 0    | 0    | 0   | 0    | 0    | 0    | 0   |
| 1    | 0    | 0    | 1   | 1    | 0    | 0    | 1   |
| 0    | 1    | 0    | 1   | 0    | 1    | 0    | 1   |
| 1    | 1    | 0    | 1   | 1    | 1    | 0    | 1   |
| 0    | 0    | 1    | 1   | 0    | 0    | 1    | 1   |
| 1    | 0    | 1    | 1   | 1    | 0    | 1    | 1   |
| 0    | 1    | 1    | 1   | 0    | 1    | 1    | 1   |
| 1    | 1    | 1    | 1   | 1    | 1    | 1    | 1   |

FIG. 10

| 103a | 103b | 103c | 130 | 102a | 102b | 102c | 110a | 110b | 110c | 120a | 120b | 120c |
|------|------|------|-----|------|------|------|------|------|------|------|------|------|
| 0 | 0 | 0 | 0 | 0 | 0 | 0 | 0 | 0 | 0 | 0 | 0 | 0 |
| 1 | 0 | 0 | 0 | 1 | 1 | 1 | 1 | 0 | 0 | 1 | 1 | 1 |
| 0 | 1 | 0 | 0 | 1 | 1 | 1 | 0 | 1 | 0 | 1 | 1 | 1 |
| 1 | 1 | 0 | 0 | 1 | 1 | 1 | 1 | 1 | 0 | 1 | 1 | 1 |
| 0 | 0 | 1 | 0 | 1 | 1 | 1 | 0 | 0 | 1 | 1 | 1 | 1 |
| 1 | 0 | 1 | 0 | 1 | 1 | 1 | 1 | 0 | 1 | 1 | 1 | 1 |
| 0 | 1 | 1 | 0 | 1 | 1 | 1 | 0 | 1 | 1 | 1 | 1 | 1 |
| 1 | 1 | 1 | 1 | 0 | 0 | 0 | 1 | 1 | 0 | 0 | 0 | 0 |
| 0 | 0 | 0 | 1 | 1 | 0 | 0 | 0 | 0 | 0 | 1 | 0 | 0 |
| 1 | 0 | 0 | 1 | 0 | 1 | 0 | 1 | 0 | 0 | 0 | 1 | 0 |
| 0 | 1 | 0 | 1 | 1 | 1 | 0 | 0 | 1 | 0 | 1 | 1 | 0 |
| 1 | 1 | 0 | 1 | 0 | 0 | 1 | 1 | 1 | 1 | 0 | 0 | 1 |
| 0 | 0 | 1 | 1 | 1 | 0 | 1 | 0 | 0 | 1 | 1 | 0 | 1 |
| 1 | 0 | 1 | 1 | 0 | 1 | 1 | 1 | 0 | 1 | 0 | 1 | 1 |
| 0 | 1 | 1 | 1 | 1 | 1 | 1 | 0 | 1 | 1 | 1 | 1 | 1 |

CONTROL METHOD OR UNIT OF A DATA TRANSMISSION APPARATUS CONTROLLING THE ELECTRIC POWER SUPPLIED TO ALL OF THE INTERFACE SECTIONS

TECHNICAL FIELD

The present invention relates to a data transmission apparatus that transmits data outward and that is utilized for a system that carries out data processing or signal communication. The present invention relates more particularly to power saving of an interface section (hereinafter referred to as an I/F section) of the data transmission apparatus, the I/F section transmitting the data.

BACKGROUND ART

Data processing apparatus such as a computer or telecommunications apparatus such as a modem or an exchanger includes a data transmission apparatus for exchanging information with the outside world. The data transmission apparatus includes a plurality of I/F sections each for transmitting data outward.

In general, the I/F section consumes a larger amount of power as compared with other circuits in the apparatus. This is because the I/F section transmits the data outward. Especially, the consumption is remarkable in the case of outputting electromagnetic waves or laser light outward or in the case where many I/F sections are provided.

For this reason, in portable devices it is especially necessary to reduce power consumption because a data transmission apparatus includes a plurality of power source units for supplying the respective I/F sections with electric power. It is widely adopted that the power source units control the supply of the electric power to the I/F sections such that the power source units stop supplying the electric power to the I/F sections that have no outside inputting/outputting of signals. When the power source units delicately control the supply of the electric power to the I/F sections, the data transmission apparatus can reduce power consumption.

However, the more complicated data transmission apparatus causes an increase of the number of components, an increase of the manufactures' cost, and an increase of the size of the apparatus. This is because the data transmission apparatus needs plural power source units whose number is equal to the number of the I/F sections.

Further, an inexpediency may arise, depending on what kind of signals are inputted and outputted between the I/F sections and a control unit for outputting data to the I/F sections: when data is supplied to the I/F section while the power source unit stops supplying the electric power to the I/F section, an internal circuit of the control unit or the I/F section is likely to break down.

Still further, the problem arises that reduction of the power consumption is not possible for an apparatus in which a power source unit does not carry out the above power control with respect to an I/F section.

DISCLOSURE OF INVENTION

In view of the foregoing conventional problems, the present invention was made, and an object of the present invention is to provide a data transmission apparatus control method, a data transmission apparatus control unit, a data transmission apparatus, a data transmission apparatus control program, and a recording medium containing the program, each capable of reducing the power consumption of I/F sections in the data transmission apparatus.

In order to achieve the object, a control method of a data transmission apparatus, in accordance with the present invention, wherein the data transmission apparatus includes: (a) a plurality of I/F sections, each converting data into a predetermined transmitting format and transmitting it to an external device; (b) a power source section that supplies electric power to the respective I/F sections; and (c) detection sections each detecting whether or not each of the I/F sections is in a connecting state with respect to the external device, is characterized by including the step of: controlling the electric power such that the electric power is supplied to all of the I/F sections from the power source section when the detection sections detect that at least one I/F section is in a connecting state, and such that no electric power is supplied to the I/F sections from the power source section when the detection sections detect that none of the I/F sections is in a connecting state.

In the control method, the term "a connecting state" indicates a state in which the I/F section can transmit data to an external device. For example, the I/F section and the external device may be connected via a wire such as an optical cable, so as to realize such a connecting state. Alternatively, the I/F section and the external device may be wirelessly connected such as by transmitting electromagnetic waves, so as to realize such a connecting state. The connecting state may be a state in which the I/F section can transmit the data to the external device, but is not required to be a state in which the external device can receive the data. On this account, for example, if a cable for transmitting the data to the external device is connected to the I/F section, the I/F section can be regarded as being in a connecting state.

According to the control method, the apparatus is controlled such that the electric power is supplied to all of the I/F sections from the power source section when at least one I/F section is in a connecting state. This allows the electric power to be supplied to the I/F section which is in a connecting state, so as to transmit data to the external device. In contrast, the apparatus is controlled such that the electric power is supplied to none of the I/F sections from the power source section when the detection sections detect that none of the I/F sections is in a connecting state. This ensures that the power consumption of all of the I/F sections becomes zero.

Thus, in the control method of the present invention, it is possible to reduce power consumption when none of the I/F sections is in a connecting state. Further, the provision of a single power source section ensures that the number of the components is reduced compared with the case where a number of power source sections equal to that of the I/F sections is provided for the purpose of reducing power consumption.

Another control method of a data transmission apparatus, in accordance with the present invention, where the data transmission apparatus includes: (a) a plurality of I/F sections and (b) detection sections, is characterized by including the step of controlling so as: to output the data to an I/F section, when the detection sections detect that the I/F section is in a connecting state when transmitting the data to the external device via the I/F, and, when the detection sections detect that the I/F section is not in a connecting state, (a) to output a signal to the I/F section, the signal causing the I/F section to transmit to the external device a signal whose output level is a low level, or (b) not to output the data to the I/F section.

In the control method, the apparatus is controlled such that the data is outputted to the I/F section, when the I/F section is in a connecting state when transmitting the data to the external device via the I/F. This allows the I/F section which is in a connecting state to transmit the data to the external device. In contrast, when the I/F section is not in a connecting state, the apparatus is controlled such that (1) a signal is outputted to the I/F section, the signal causing the I/F section to output to the external device a signal whose output level is a low level, or (2) the data is not outputted to the I/F section. This causes the output level of the I/F section which is not in a connecting state to be a low level or zero, thereby ensuring a reduction of the power consumption.

Thus, according to the data transmission apparatus control method of the present invention, it is possible to reduce the power consumption with respect to the I/F section that is not in a connecting state, even in a data transmission apparatus which does not carry out reduction of the power consumption based on the electric power control of the I/F section.

A data transmission apparatus including a control unit in accordance with the present invention includes: a plurality of interface sections; a power source section; a control unit that controls the power source section; detection sections each detecting whether or not each of the interface sections is in a connecting state with respect to an external device, and outputting a connecting detection signal to the control unit. The control unit is characterized by including a power control section that outputs to the power source section a power control signal for controlling the electric power such that the electric power is supplied to all of the I/F sections from the power source section when it is detected that at least one I/F section is in a connecting state, and such that no electric power is supplied to the I/F sections when it is detected that none of the I/F sections is in a connecting state.

In the data transmission apparatus, each of the detection sections outputs a connecting detection signal which varies depending on the connecting state of each I/F section. The control unit outputs to the power source the power control signal which varies depending on the connecting detection signals, and the power source section supplies or does not supply the electric power to the I/F sections in accordance with the power control signal.

The control unit including the above arrangement outputs to the power source section a power control signal for controlling the electric power such that the electric power is supplied to all of the I/F sections from the power source section when it is detected that at least one I/F section is in a connecting state. In contrast, the control unit outputs to the power source section a power control signal for controlling the electric power such that no electric power is supplied to the interface sections when it is detected that none of the I/F sections is in a connecting state.

At this time, in the data transmission apparatus, the electric power is supplied to all of the I/F sections from the power source section in accordance with the controlling of the control unit, when it is detected that at least one I/F section is in a connecting state. This allows the electric power to be supplied to the I/F section which is in a connecting state, so as to transmit data to the external device. In contrast, no electric power is supplied to the I/F sections in accordance with the controlling of the control unit when it is detected that none of the I/F sections is in a connecting state. This allows the power consumption of all of the I/F sections to become zero.

Although a single power source section is provided in the data transmission apparatus, in which the control unit is included, of the present invention, it is possible to reduce the power consumption with few components. This is because it is possible to reduce the power consumption when none of the I/F sections is in a connecting state.

A data transmission apparatus including a control unit in accordance with the present invention, includes: a plurality of interface sections; a control unit that controls outputting of data to the interface sections; and detection sections. The control unit is characterized by including an output control section that controls the control unit in accordance with the connecting detection signal such that: when the detection section detects that an I/F section which is in process of outputting data to be transmitted to an external device is in a connecting state, the data is outputted to the I/F section, and when the detection section detects that an I/F section which is in a process of outputting data to be transmitted to an external device is not in a connecting state, (a) a signal is outputted to the I/F section, the signal causing the I/F section to output to the external device a signal whose output level is a low level, or (b) the data is not outputted to the I/F section.

In the data transmission apparatus, each of the detection sections outputs to the control unit a connecting detection signal which varies depending on a connecting state of each I/F section. The control unit outputs the data to the I/F section in response to the connecting detection signal.

With the control unit including the above arrangement, the output control section outputs the data to an I/F section which is in a process of outputting the data to be transmitted to the external device, when the I/F section is in a connecting state. This allows the I/F section, which is in a connecting state, to transmit the data to the external device. In contrast, when the I/F section which is in a process of outputting the data to be transmitted to the external device is not in a connecting state, it is controlled such that (a) a signal is outputted to the I/F section, the signal causing the I/F section to output to the external device a signal whose output level is a low level, or (b) the data is not outputted to the I/F section. This causes the output level of the I/F section to become a low level or zero, thereby realizing a reduction of the power consumption.

Thus, it is possible for a data transmission apparatus including a control unit of the present invention to reduce the power consumption with respect to the I/F section that is not in a connecting state, even in a data transmission apparatus which does not carry out the reduction of the power consumption based on the electric power control of the I/F section.

A data transmission apparatus in accordance with the present invention, is characterized by including: a plurality of I/F sections; at least one power source section; one of the control units having the above-described respective features; and detection sections.

With the data transmission apparatus having the above described arrangement, it is possible to obtain the same effect as the foregoing effect.

It is possible for a computer to carry out the control method of the data transmission apparatus, when a control program corresponding to the control method of the data transmission apparatus is executed by the computer. When the control program of the data transmission apparatus is recorded in a computer-readable recording medium, it is possible for any computer to carry out the control method of the data transmission apparatus.

For a fuller understanding of the nature and advantages of the invention, reference should be made to the ensuing detailed description taken in conjunction with the accompanying drawings.

BRIEF DESCRIPTION OF DRAWINGS

FIG. 3 is a truth table for a control circuit shown in FIG. 2, the truth table showing a logical level of a connecting detection signal and a logical level of a corresponding power control signal.

FIG. 5 is a truth table for a control circuit shown in FIG. 4, the truth table showing a logical level of a connecting detection signal, and a logical level of a corresponding power control signal, and a logical level of an output level control signal.

FIG. 7 is a truth table for a control circuit shown in FIG. 6, the truth table showing a logical level of a connecting detection signal, and a logical level of a corresponding power control signal, a logical level of an output level control signal, and a logical level of an output buffer control signal.

FIG. 10 is a truth table for a control circuit shown in FIG. 9, the truth table showing logical levels of respective connecting detection signal and mode signal, a logical level of a corresponding power control signal, a logical level of an output level control signal, and a logical level of an output buffer control signal.

BEST MODE FOR CARRYING OUT THE INVENTION

First Embodiment

Figure 1:
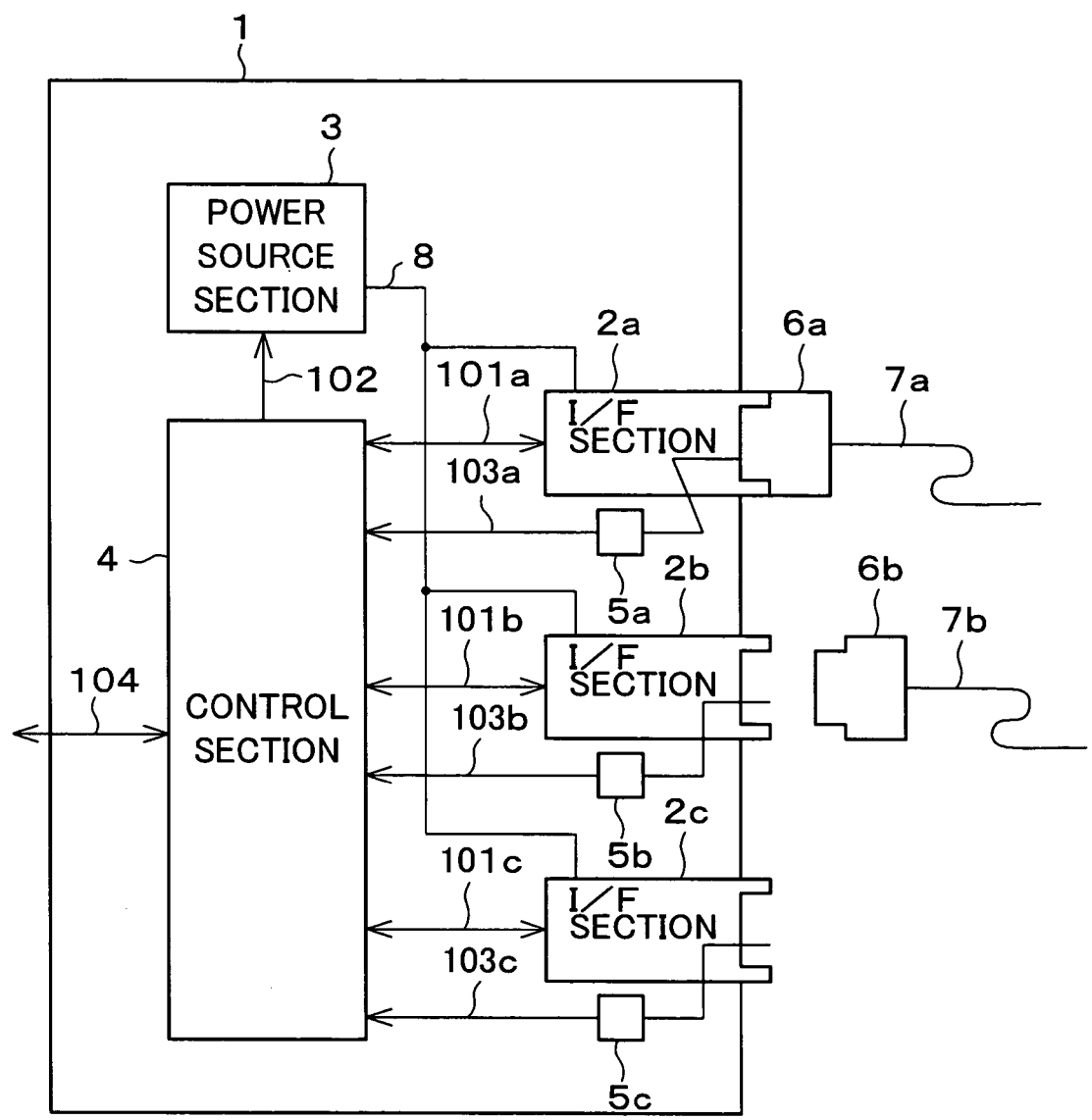
FIG. 1 is a block diagram showing a schematic arrangement of a data transmission apparatus of one embodiment in accordance with the present invention.
Figure 2:
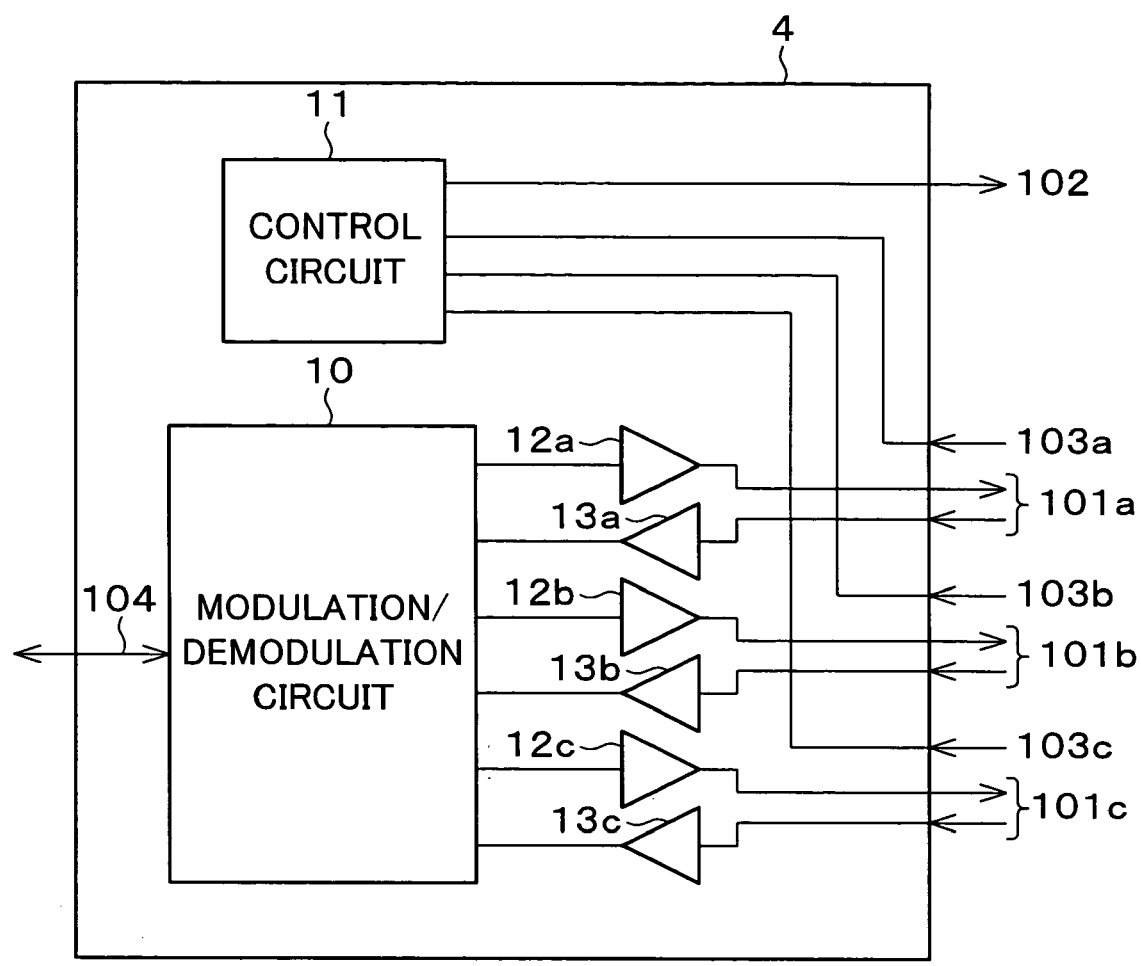
FIG. 2 is a block diagram showing a schematic arrangement of a control section shown in FIG. 1.

The following description deals with a first embodiment with reference to FIG. 1 through FIG. 3.

FIG. 1 is a block diagram showing a schematic arrangement of a data transmission apparatus of one embodiment in accordance with the present invention. The data transmission apparatus 1 includes: three I/F sections 2a, 2b, and 2c for transmitting data to external devices via optical communications; a single power source section 3 for supplying electric power to the I/F sections 2a through 2c; a control section 4 (a control unit) for controlling the I/F sections 2a through 2c and the power source section 3, respectively; and detection sections 5a, 5b, and 5c for detecting whether or not the respective I/F sections 2a through 2c are in a connecting state and for transmitting respective connecting detection signals to the control section 4.

Plugs 6a and 6b are provided so as to be connected or disconnected with the I/F sections 2a through 2c, respectively. The plug 6a corresponds to one terminal of an optical fiber 7a. The plug 6b corresponds to one terminal of an optical fiber 7b. Note that plugs (not shown) corresponding to the other terminals of the respective optical fibers 7a and 7b are connected with an external device (not shown). Note also that it is judged in the present embodiment and subsequent embodiments whether or not the respective I/F sections 2a through 2c are in a connecting state based on whether or not the respective plugs are put in the I/F sections 2a through 2c. Further, note that the inputting and outputting of data signals 101a through 101c, each being an electrical signal, are carried out between the control section 4 and the I/F sections 2a through 2c, respectively.

Each of the I/F sections 2a through 2c includes a light emitting element which converts an electrical signal into an optical signal and a light receiving element which converts an inputted optical signal into an electrical signal. The data signals 101a through 101c, each being an electrical signal, that have been supplied to the respective I/F sections 2a through 2c from the control section 4 are converted into optical signals by the respective light emitting elements. The optical signals thus converted are outputted to the external device via the plugs 6a and 6b and the optical fibers 7a and 7b, respectively. On the other hand, optical signals that have been supplied to the I/F sections 2a through 2c as data signals from the external device via the optical fibers 7a and 7b and the plugs 6a and 6b, are converted into electrical signals by the respective light receiving elements. The electrical signals thus converted are outputted to the control section 4 as the data signals 101a through 101c, respectively.

When electric power is supplied to the I/F sections 2a through 2c from the power source section 3 via a power supply line 8, the I/F sections 2a through 2c operate, respectively. The power source section 3 supplies the electric power or stops supplying the electric power in accordance with a power control signal 102 supplied from the control section 4.

According to the present embodiment, it is assumed that (a) the power control signal 102 is a digital signal, (b) when the power control signal 102 has a logical level of "1", the power source section 3 supplies the electric power to the I/F sections 2a through 2c, respectively, and (c) when the power control signal 102 has a logical level of "0", the power source section 3 stops supplying the electric power to the I/F sections 2a through 2c, respectively.

The detection sections 5a through 5c detect whether or not the plugs are put in the I/F sections 2a through 2c, respectively, and output the connecting detection signals 103a through 103c to the control section 4, respectively. According to the present invention, when the detection sections 5a through 5c detect that the plugs are put in the I/F sections 2a through 2c (hereinafter this state will be referred to as a connecting state), the detection sections 5a through 5c output the respective connecting detection signals 103a through 103c whose logical levels are "1". On the other hand, when the detection sections 5a through 5c detect that the plugs are not put in the I/F sections 2a through 2c (hereinafter this state will be referred to as a nonconnecting state), the detection sections 5a through 5c output the respective connecting detection signals 103a through 103c whose logical levels are "0".

The control section 4 modulates (a) an electric signal that has been supplied as an input/output signal 104 from an external device such as a computer to (b) an electric signal that has a transmitting format suitable for optical communications. The electric signal thus modulated is outputted to the I/F sections 2a through 2c as the data signals 101a through 101c, respectively. Note that the control section 4 may output the data signal to one of the I/F sections 2a through 2c in accordance with the information contained in the input/output signal 104. Alternatively, the control section 4 may simultaneously output the data signals to all the I/F sections 2a through 2c, respectively.

The control section 4 demodulates (a) electric signals that have been supplied as the data signals 101a through 101c from the I/F sections 2a through 2c, respectively, to (b) electric signals that have an appropriate transmitting format. The electric signals thus demodulated are outputted to the external device as the input/output signal 104. For example, these modulations and demodulations are conversions such as protocol conversions, analog-digital conversions, or parallel-serial conversions. The control section 4 also (i) generates the power control signal 102 in response to the connecting detection signals 103a through 103c that have been supplied from the detection sections 5a through 5c, respectively, and (ii) outputs the power control signal 102 thus generated to the power source section 3.

FIG. 2 is a block diagram showing a schematic arrangement of the control unit 4. The control unit 4 includes a modulation/demodulation circuit 10, a control circuit 11 (power control section), buffer circuits 12a, 12b, 12c, 13a, 13b, and 13c, respectively. In the modulation/demodulation circuit 10, the conversions of transmitting formats are carried out between the input/output signal 104 and the data signals 101a through 101c. The control circuit 11 (i) generates the power control signal 102 in response to the connecting detection signals 103a through 103c that have been supplied from the detection sections 5a through 5c, respectively, and (ii) outputs the power control signal 102 thus generated to the power source section 3. The buffer circuits 12a through 12c and 13a through 13c adjust voltage levels and current levels between the modulation/demodulation circuit 10 and the I/F sections 2a through 2c, respectively.

Further, the buffer circuits 12a through 12c and 13a through 13c may temporally store the respective data signals 101a through 101c that are transmitted or received. In this case, the buffer circuits 12a through 12c can prevent a disappearance of data. Such a disappearance occurs when a transmitting speed, for the data signals 101a through 101c that are outputted to the I/F sections 2a through 2c from the modulation/demodulation circuit 10, is faster than a processing speed for the data signals 101a through 101c in the respective I/F sections 2a through 2c. The buffer circuits 13a through 13c can prevent a disappearance of data. Such a disappearance occurs when a transmitting speed, for the data signals 101a through 101c that are outputted to the modulation/demodulation circuit 10 from the respective I/F sections 2a through 2c, is faster than a processing speed for the data signals 101a through 101c in the modulation/demodulation circuit 10.

FIG. 3 is a truth table for the control circuit 11, the truth table showing a logical level of connecting detection signals 103a through 103c and a logical level of a corresponding power control signal 102. The operation in accordance with the truth table is realized by a logical circuit represented by a logical formula of L(102)=L(103a)+L(103b)+L(103c). Here, it is assumed that L(x) indicates a logical level of a signal x, and "+" indicates a logical sum.

As is clear from FIG. 3, the control circuit 11 outputs to the power source section 3 a power control signal 102 having a logical level of "0", when all the logical levels of the connecting detection signals 103a through 103c are "0", i.e., only when none of the I/F sections 2a through 2c is in a connecting state, whereas the control circuit 11 outputs to the power source section 3 a power control signal 102 having a logical level of "1", when at least one of the connecting detection signals 103a through 103c has a logical level of "1", i.e., only when at least one of the I/F sections 2a through 2c is in a connecting state.

In a data transmission apparatus 1 having the above arrangement, when at least one of the I/F sections 2a through 2c is in a connecting state, at least one of the connecting detection signals 103a through 103c, that are supplied to the control circuit 11 of the control section 4 from the detection sections 5a through 5c, has a logical level of "1". As is clear from FIG. 3, the control circuit 11 generates a power control signal 102 having a logical level of "1", and outputs it to the power source section 3. The power source section 3 supplies the electric power to all the I/F sections 2a through 2c, so as to operate all the I/F sections 2a through 2c.

In this case, when the input/output signal 104 is supplied to the modulation/demodulation circuit 10 of the control section 4, the modulation/demodulation circuit 10 modulates the input/output signal 104 to an electrical signal having an appropriate transmitting format, and outputs the electrical signal thus modulated to the I/F sections 2a through 2c as the data signals 101a through 101c via the buffer circuits 12a through 12c, respectively. The I/F sections 2a through 2c convert the data signals 101a through 101c (electrical signals) into optical signals, and transmit the optical signals to external devices via the plugs 6a and 6b and the optical fibers 7a and 7b, respectively.

When optical signals are supplied to the I/F sections 2a through 2c from an external device via the optical fibers 7a and 7b and the plugs 6a and 6b, respectively, the I/F sections 2a through 2c convert the optical signals into electrical signals, and output them as data signals 101a through 101c to the modulation/demodulation circuit 10 of the control section 4 via the buffer circuits 12a through 12c of the control section 4, respectively. The modulation/demodulation circuit 10 modulates the data signals 101a through 101c to an electrical signal having an appropriate transmitting format, and outputs the electrical signal thus modulated to an external device as the input/output signal 104.

In the data transmission apparatus 1, when none of the I/F sections 2a through 2c is in a connecting state, all the connecting detection signals 103a through 103c, which are supplied to the control circuit 11 of the control section 4 from the detection sections 5a though 5c, have a logical level of "0", respectively. As is clear from FIG. 3, the control circuit 11 generates a power control signal 102 having a logical level of "0", and outputs it to the power source section 3. The power source section 3 stops supplying the electric power to all the I/F sections 2a through 2c, such that all the I/F sections 2a through 2c stop operating. Thus, the power consumption in the I/F sections 2a through 2c becomes zero.

In this case, the I/F sections 2a through 2c will never convert the data signals 101a through 101c into optical signals and such optical signals will never be transmitted to an external device, even when the input/output signal 104 is supplied to the modulation/demodulation circuit 10 of the control section 4 and when the modulation/demodulation circuit 10 outputs the data signals 101a through 101c to the I/F sections 2a through 2c via the buffer circuits 12a through 12c, respectively. This is because the I/F sections 2a through 2c stop operating.

Thus, the data transmission apparatus 1 of the present embodiment can save the power consumption of the I/F sections 2a through 2c, while including only a single power source section 3. Accordingly, it is possible for the data transmission apparatus 1 to realize a reduction of the power consumption with fewer components than a case where each of the I/F sections 2a through 2c has a power source section.

When the light emitting elements of the I/F sections 2a through 2c emit light having great intensity or emit coherent light, the following should be noted: if the light emitting elements emit the light without putting the plugs 6a and 6b in the I/F sections 2a through 2c, it is likely that the eyes of a user will be injured. In contrast, according to the data transmission apparatus of the present embodiment, it is possible to eliminate the risk. This is because all the I/F sections 2a through 2c stop operating when none of the I/F sections 2a through 2c is in a connecting state.

Second Embodiment

Figure 4:
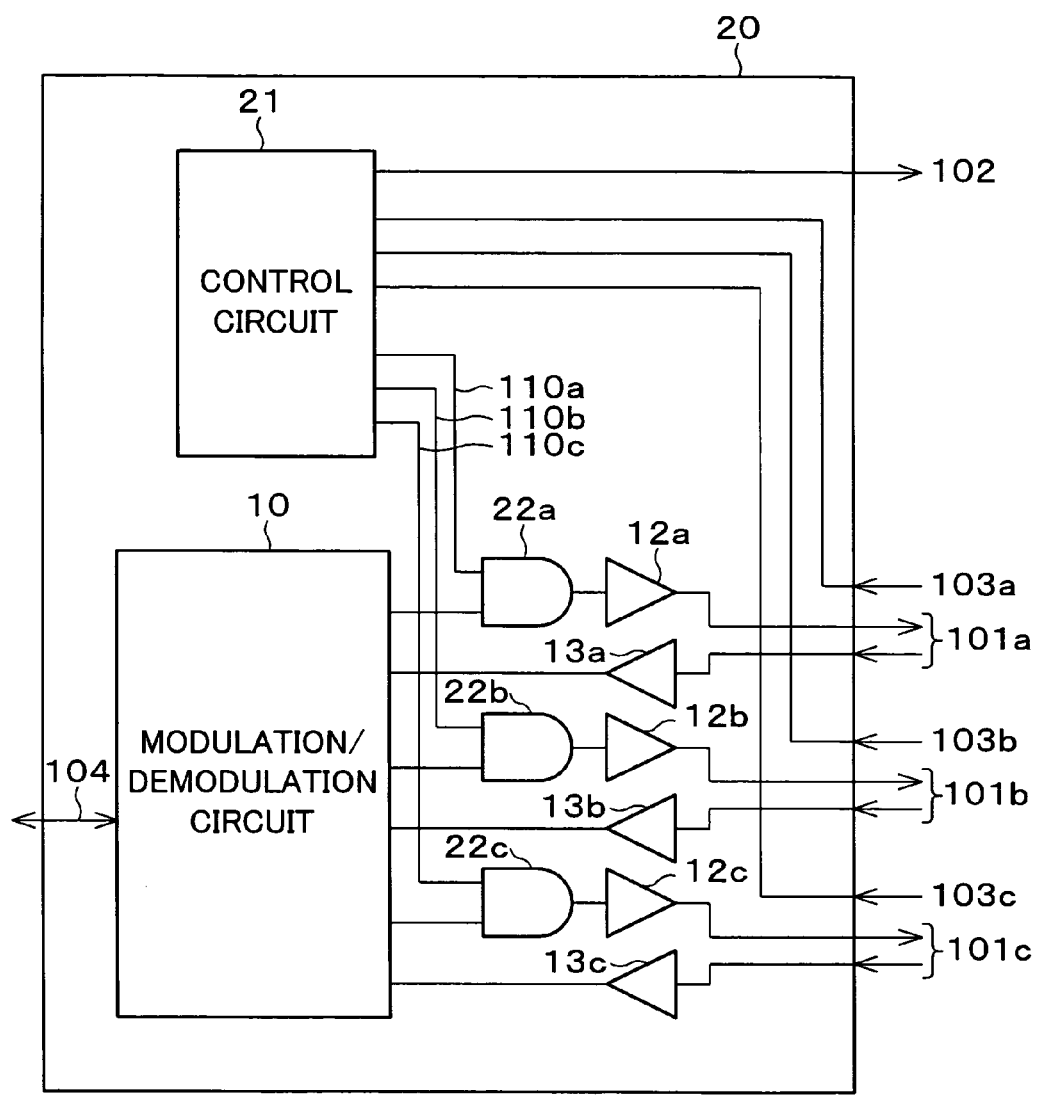
FIG. 4 is a block diagram showing a schematic arrangement of a control section of a data transmission apparatus of another embodiment in accordance with the present invention.

The following description deals with another embodiment of the present invention with reference to FIG. 4 and FIG. 5. Note that the same reference numerals and symbols are assigned to structures having the same functions as those of the foregoing first embodiment, and note that their descriptions are omitted here.

A data transmission apparatus in accordance with the present embodiment has a similar arrangement to the data transmission apparatus 1 shown in FIG. 1, except that a control section is used whose arrangement is different from the foregoing control section 4. FIG. 4 is a block diagram showing a schematic arrangement of a control section 20 in accordance with the present embodiment. The control section 20 differs from the control section 4 shown in FIG. 2 in that the operation of a control circuit 21 is different and that AND circuits 22a, 22b, and 22c are provided, the other arrangement is similar to that shown in FIG. 2.

The control circuit 21 (power control section, output level control section) generates a power control signal 102 and output level control signals 110a, 110b, and 110c in response to the connecting detection signals 103a through 103c that have been supplied from the detection sections 5a through 5c, respectively. The control circuit 21 outputs the power control signal 102 thus generated to the power source section 3, and outputs the output level control signals 110a through 110c to the AND circuits 22a through 22c, respectively.

The AND circuits 22a through 22c are provided between the modulation/demodulation circuit 10 and the buffer circuits 12a through 12c, respectively. The AND circuits 22a through 22c receive the data signals 101a through 101c from the modulation/demodulation circuit 10, and receive the output level control signals 110a through 110c from the control circuit 21, respectively. The AND circuits 22a through 22c output the data signals 101a through 101c to the buffer circuits 12a through 12c, respectively, when the output level control signals 110a through 110c have a logical level of "1". Whereas, the AND circuits 22a through 22c output signals, each having a logical level of "0", to the buffer circuits 12a through 12c, respectively, when the output level control signals 110a through 110c have a logical level of "0".

FIG. 5. is a truth table for the control unit 21, the truth table showing logical levels of the connecting detection signals 103a through 103c and a logical level of a corresponding power control signal 102, and logical levels of output level control signals 110a through 110c. The operation in accordance with the truth table is realized by a logical circuit represented by a logical formulae: L(102)=L(103a)+L(103b)+L(103c); L(110a)=L(103a); L(10b)=L(103b); and L(10c)=L(103c).

More specifically, the power control signal 102 generated by the control circuit 21 of the present embodiment has the same logical level as that of the control circuit 11 shown in FIG. 2 or FIG. 3. The output level control signals 110a through 110c generated by the control circuit 21 have the same logical levels as those of the connecting detection signals 103a through 103c, respectively.

In a data transmission apparatus 1 having the above arrangement, the control circuit generates the same power control signal 102 as that generated by the data transmission apparatus 1 shown in FIG. 1 through FIG. 3. A result of this is that the present data transmission apparatus 1 has the same functions and effects as those of the data transmission apparatus 1 shown in FIG. 1, FIG. 2, or FIG. 3. The present data transmission apparatus 1 has the following additional functions and effects.

In the present data transmission apparatus 1, connecting detection signals, supplied from I/F sections that are in a connecting state, have a logical level of "1,". Accordingly, the logical levels of the output level control signals become "1", as is clear from FIG. 5. This allows the AND circuits to which the output level control signals are supplied to output data signals that have been supplied to the AND circuits.

For example, when the I/F section 2a is in a connecting state, the control circuit 21 outputs an output level control signal 110a whose logical level is "1". This is because the detection section 5a outputs a connecting detection signal 103a whose logical level is "1,". Accordingly, the data signal 101a which has been supplied to the AND circuit 22a is outputted to the I/F section 2a via the buffer circuit 12a for output-use.

In contrast, when at least one I/F section exists which is not in a connecting state, a connecting detection signal, supplied from a detection section that is connected to the I/F section, has a logical level of "0". Accordingly, the logical levels of the output level control signals corresponding to the connecting detection signals become "0", as is clear from FIG. 5. This causes the AND circuit, to which the output level control signal is supplied, to output a signal whose logical level is "0".

For example, when the I/F section 2c is not in a connecting state, the control circuit 21 outputs an output level control signal 110c whose logical level is "0". This is because the detection section 5c outputs a connecting detection signal 103c whose logical level is "0". Accordingly, the signal, which has been supplied to the I/F section 2c from the AND circuit 22c via the buffer circuit 12c for output-use, has a logical level of "0".

Thus, the I/F section 2a which is in a connecting state converts the data signal 101a supplied from the modulation/demodulation circuit 10 into the optical signal, and transmits the optical signal to an external device via the plug 6a and the optical fiber 7a, whereas the I/F section 2c which is not a connecting state receives a signal whose logical level is "0". The light emitting element of the I/F section 2c will never emit the light. The foregoing risk, caused by the light emitted outward from the I/F section which is not in a connecting state, can be avoided for each I/F section. In an I/F section in which the power consumption is greater during a light emitting state than during a state in which light is not emitted, it is possible to obtain the effect of reducing the power consumption. Further, it is possible to prevent the deterioration of the light emitting element in an I/F section which is not in a connecting state. This is because the stopping of emitting of the light is kept in the light emitting element of such an I/F section.

Note that the foregoing description deals with the case where the stopping of emitting of the light in the light emitting element of the I/F section 2c is realized by the arrangement in which (a) the AND circuits 22a through 22c are provided in the control section 20 and (b) the data signals whose logical levels are "0" are supplied to the I/F sections 2a through 2c from the control section 20. The arrangement may be replaced by an arrangement in which (a) an enable signal is supplied to the I/F sections 2a through 2c from the control circuit 21 of the control section 20 and (b) the stopping of emitting of the light in the I/F sections 2a through 2c is carried out in response to the enable signal. In the case where the supply of the electric power to the I/F sections is stopped, it is preferable that transmitting lines for the data signals and a transmitting line for the enable signal have high impedance, respectively. This ensures that a failure of an internal circuit in the control section or the I/F section will be avoided.

Third Embodiment

Figure 6:
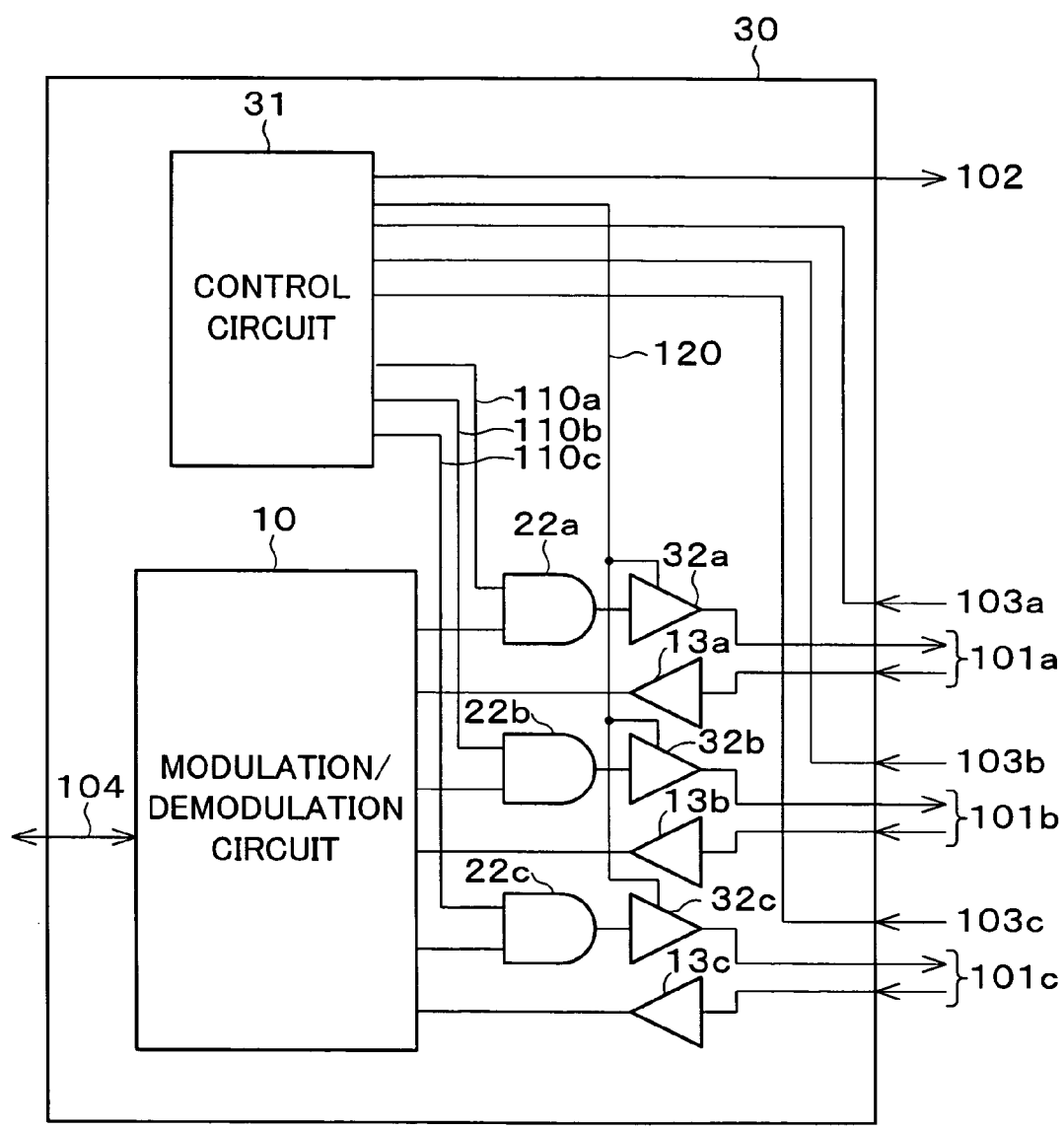
FIG. 6 is a block diagram showing a schematic arrangement of a control section of a data transmission apparatus of a further embodiment in accordance with the present invention.

The following description deals with a further embodiment in accordance with the present invention with reference to FIG. 6 and FIG. 7. Note that the same reference numerals and symbols are assigned to structures having the same functions as those of the foregoing embodiments, and note that their descriptions are omitted here.

An input device in accordance with the present embodiment has a similar arrangement to the data transmission apparatus 1 shown in FIG. 1, except that a control section whose arrangement is different from the control section 4 is provided. FIG. 6 is a block diagram showing a schematic arrangement of a control section 30. The control section 30 of the present embodiment has a similar arrangement to the control section 20 shown in FIG. 4, except that a control circuit operates in a different manner and that buffer circuits 32a, 32b, and 32c for output-use are three-state buffer circuits, respectively.

The control circuit 31 (power control section, output level control section, and output permission control section) generates a power control signal 102, output level control signals 110a through 110c, and an output buffer control signal 120 in response to connecting detection signals 103a through 103c from detection sections 5a through 5c, respectively. The power control signal 102 is supplied to a power source section 3. The output level control signals 110a through 110c are supplied to AND circuits 22a through 22c, respectively. The output buffer control signal 120 is supplied to three-state buffer circuits 32a through 32c for output-use, respectively.

The three-state buffer circuits 32a through 32c for output-use output signals from the AND circuits 22a through 22c, respectively when the output buffer control signal 120 has a logical level of "1", whereas they are fixed to high impedance when the output buffer control signal 120 has a logical level of "0".

FIG. 7. is a truth table for the control unit 31, the truth table showing logical levels of the connecting detection signals 103a through 103c and a logical level of a corresponding power control signal 102, logical levels of output level control signals 110a through 110c, and a logical level of the output buffer control signal 120, respectively. The operation in accordance with the truth table is realized by a logical circuit represented by a logical formulae: $L(102)=L(120)=L(103a)+L(103b)+L(103c)$; $L(110a)=L(103a)$; $L(110b)=L(103b)$; and $L(110c)=L(103c)$.

More specifically, the power control signal 102 generated by the control circuit 31 of the present embodiment has the same logical level as that of the control circuit 11 shown in FIG. 2 or FIG. 3. Like the output level control signals 110a through 110c generated by the control circuit 21 shown in FIG. 4 or FIG. 5, the output level control signals 110a through 110c generated by the control circuit 31 have the same logical levels as those of the connecting detection signals 103a through 103c, respectively. The output buffer control signal 120 generated by the control circuit 31 has the same logical level as that of the power control signal 102.

In a data transmission apparatus 1 having the above arrangement, the control circuit generates the same power control signal 102 as that generated by the data transmission apparatus 1 shown in FIG. 1, FIG. 2, or FIG. 3. This results in that the present data transmission apparatus 1 has the same functions and effects as those of the data transmission apparatus 1 shown in FIG. 1, FIG. 2, or FIG. 3. In a data transmission apparatus 1 having the above arrangement, the control circuit also generates the same output level control signals 110a through 110c as those generated by the data transmission apparatus 1 shown in FIG. 4 or FIG. 5. This results in that the present data transmission apparatus 1 has the same functions and effects as those of the data transmission apparatus 1 shown in FIG. 4 or FIG. 5. The present data transmission apparatus 1 has the following additional functions and effects.

In the present data transmission apparatus 1, when none of I/F sections 2a through 2c is in a connecting state, the control circuit 31 outputs a power control signal 102 having a logical level of "0" to a power source section 3. On this account, no electric power is supplied to the I/F sections 2a through 2c. Further, when the output buffer control signal 120 having a logical level of "0" is supplied to the respective three-state buffer circuits 32a through 32c for output-use, the three-state buffer circuits 32a through 32c for output-use are fixed to high impedance, respectively. This prevents the data signals 101a through 101c from being supplied to the I/F sections 2a through 2c from the buffer circuits 32a through 32c.

By the way, the following problem arises, depending on what kind of signal format is used between the control section 30 and the I/F sections 2a through 2c: an internal circuit of the control section 30 or the I/F sections 2a through 2c is likely to breakdown when signals are inputted or outputted to the I/F sections 2a through 2c while no electric power is supplied to the I/F sections 2a through 2c. For example, it is assumed that the control section 30 and the I/F sections 2a through 2c are connected in accordance with a differential signal format. When signals are supplied to the I/F sections 2a through 2c to which no electric power is supplied, a relatively large current flows into each power source circuit in the I/F sections 2a through 2c via each input protection diode of the I/F sections 2a through 2c. As a result, it is likely that driving transistors for driving the data signals 101a through 101c in the input protection diodes or the control section 30 breakdown.

In contrast, according to the data transmission apparatus of the present embodiment, it is possible to prevent the I/F sections 2a through 2c, to which no electric power is supplied, from receiving any signals, respectively. Accordingly, it is possible to avoid the occurrence of the above-described problem.

Since the I/F section 2c that is not in a connecting state does not receive any data from the control section 30, the I/F section 2c will never transmit any data to an external device. Thus, it is possible to realize the power saving of the I/F section 2c.

Fourth Embodiment

Figure 8:
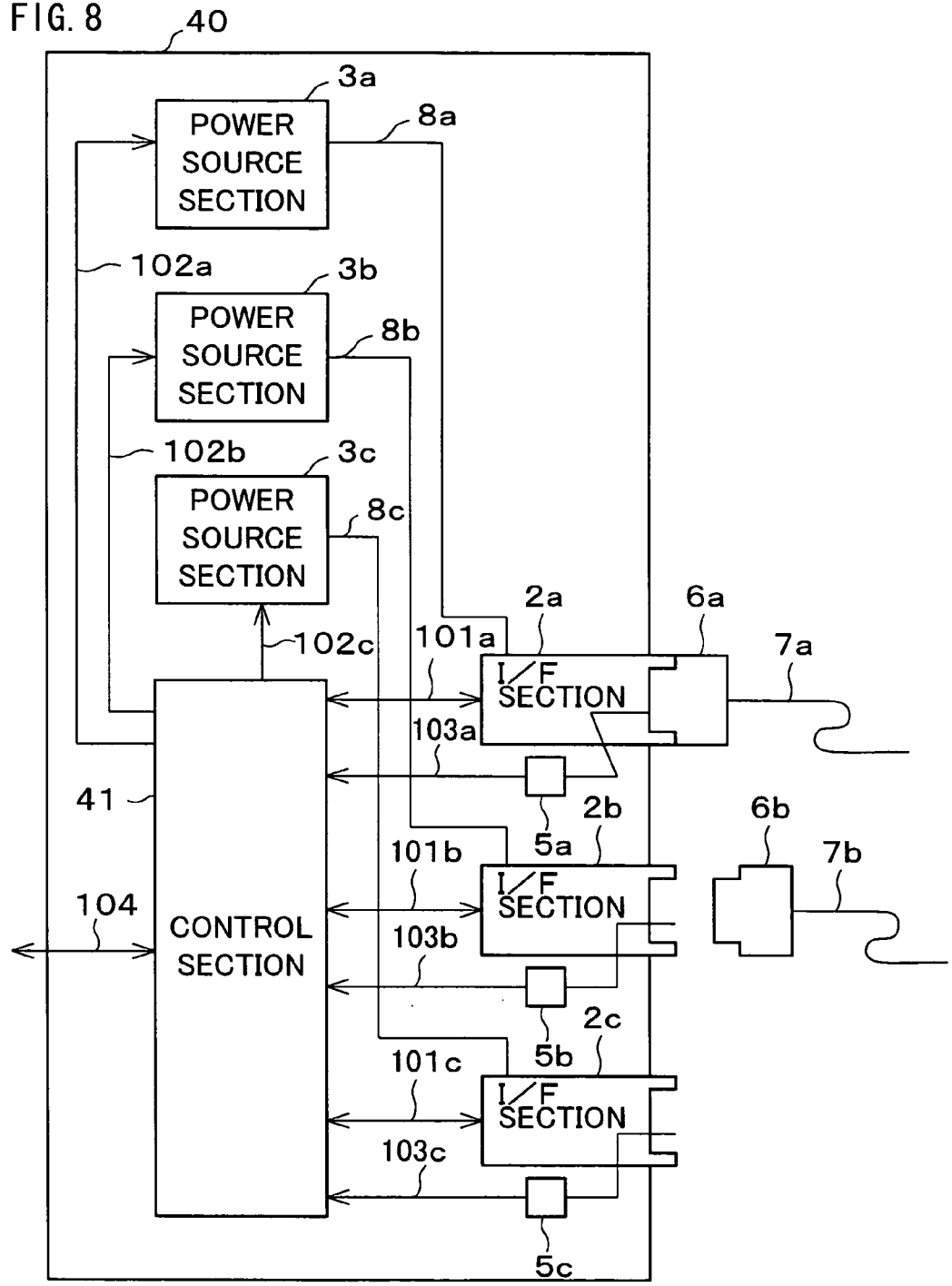
FIG. 8 is a block diagram showing a schematic arrangement of a data transmission apparatus of still a further embodiment in accordance with the present invention.
Figure 9:
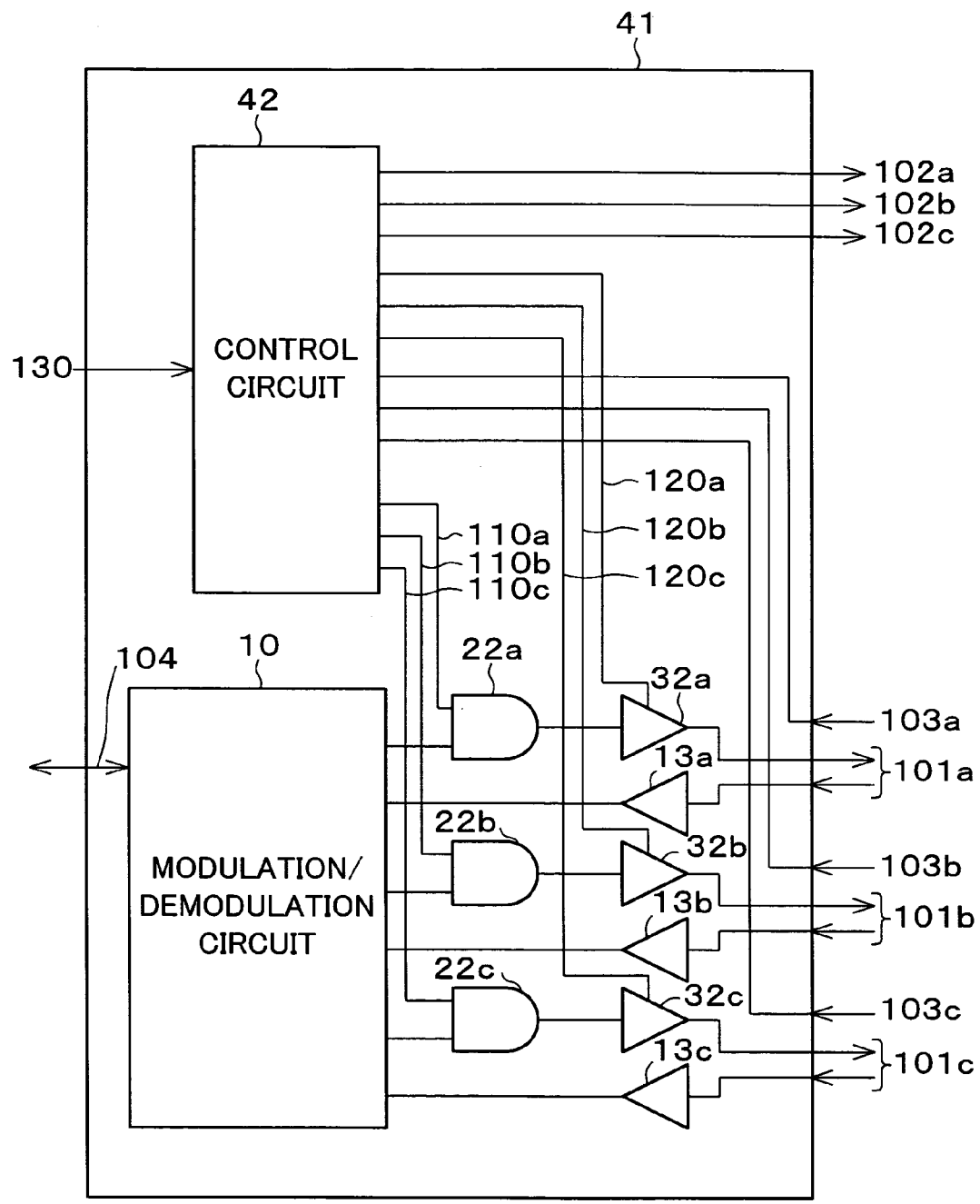
FIG. 9 is a block diagram showing a schematic arrangement of a control section shown in FIG. 8.

The following description deals with a further embodiment in accordance with the present invention with reference to FIG. 8 through FIG. 10. Note that the same reference numerals and symbols are assigned to structures having the same functions as those of the foregoing embodiments, and note that their descriptions are omitted here.

A data transmission apparatus 40 shown in FIG. 8 has a similar arrangement to that of the data transmission apparatus 1 shown in FIG. 1, except that (i) three power source sections 3a, 3b, and 3c are provided in place of a single power source section 3, and (ii) a control section 41, having a different arrangement than the control section 4, is provided.

The power source sections 3a through 3c supply the electric power to the I/F sections 2a through 2c in response to power control signals 102a, 102b, and 102c from the control section 41, respectively, via power supply lines 103a, 103b, and 103c.

In the present embodiment, like the foregoing embodiments, the power control signals 102a through 102c are digital signals, and the power source sections 3a through 3c (a) supply the electric power to the I/F sections 2a through 2c, respectively, when the power control signals 102a through 102c have a logical level of "1", whereas (b) no electric power is supplied to the I/F sections 2a through 2c when the power control signals 102a through 102c have a logical level of "0".

FIG. 9 is a block diagram showing a schematic arrangement of the control section 41. The control section 41 of the present embodiment has a similar arrangement to the control section 30 shown in FIG. 6, except that control circuit 42 has different circuitry than the control circuit 31.

The control circuit 42 (power control section, output level control section, output permission control section, individual power control section, output control section, and switching section) generates power control signals 102a through 102c, output level control signals 110a through 110c, and output buffer control signals 120a through 120c in response to connecting detection signals 103a through 103c from detection sections 5a through 5c, respectively. The power control signals 102a through 102c are supplied to power source sections 3a through 3c, respectively. The output level control signals 110a through 110c are supplied to AND circuits 22a through 22c, respectively. The output buffer control signals 120a through 120c are supplied to three-state buffer circuits 32a through 32c for output-use, respectively.

A mode signal 130 is externally supplied to the control circuit 42 in the control section 41. In response to the mode signal 130, the operations of the present embodiment and similar operations to those of the data transmission apparatus 1 shown in FIG. 6 or FIG. 7 are switched.

FIG. 10. is a truth table for the control unit 42, the truth table showing logical levels of the connecting detection signals 103a through 103c, a logical level of the mode signal 130, corresponding power control signals 102a through 102c, logical levels of output level control signals 110a through 110c, and logical levels of the output buffer control signals 120a through 120c, respectively. The operation in accordance with the truth table is realized by a logical circuit represented by a logical formulae: $L(102a)=L(120a)=$ not $L(130)*(L(103a)+L(103b)+L(103c))+L(130)*L(103a)$; $L(102b)=L(120b)=$ not $L(130)*(L(103a)+L(103b)+L(103c))+L(130)* L(103b)$; $L(102c)=L(120c)=$ not $L(130)*(L(103a)+L(103b)+L(103c))+L(130)*L(103c)$; $L(110a)=L(103a)$; $L(110b)=L(103b)$; and $L(110c)=L(103c)$. Note in the logical formulae that "not" indicates a logical inversion and that "*" indicates a logical product.

In the data transmission apparatus 40 having the above arrangement, when the mode signal 130 has a logical level of "0", it is possible to obtain similar functions and effects to those of the data transmission apparatus 1 shown in FIG. 6 or FIG. 7, whereas, when the mode signal 130 has a logical level of "1", it is possible to carry out the power control for each of the I/F sections 2a through 2c.

Thus, although the number of the components increases due to the increase in the number of the power source sections 3a through 3c according to the data transmission apparatus 40 of the present invention, the power control is delicately carried out with respect to each of the I/F sections 2a through 2c. It is possible to further reduce the power consumption, accordingly.

Further, in the data transmission apparatus 40 of the present embodiment, a mode signal having a logical level of "0", is supplied when a single power source section 3 carries out the power control for all of the I/F sections 2a through 2c, whereas, a mode signal having a logical level of "1" is supplied when the power source sections 3a through 3c carry out power controls for the I/F sections 2a through 2c, respectively. This ensures that the power control is carried out in accordance with the number of the power source sections, thereby enabling the power consumption to be reduced. Thus, the control section 41 of the present embodiment can carry out power control in accordance with the number of power source sections. This means that it is possible to expect volume efficiency when the control section 41 is provided in an integrated manner.

The above description of the embodiments deals with a case where the I/F sections corresponding to two-way communication are provided. However, the present invention is not limited to such a case, i.e., the present invention may be applied to a case where the I/F sections are transmitters which carry out outputting only or may be applied to a case where the I/F sections are receivers which carry out inputting only.

In the above description, the control section is shown as an independent component. However, the present invention is not limited to this, i.e., the present invention may be realized by an alternative component, having other functions, such as software executed by a microprocessor contained in the data transmission apparatus.

It is also possible to incorporate one part of the functions of the control section into the I/F section(s). For example, the following arrangement may be possible: the buffer circuits 12a through 12c, the buffer circuits 13a through 13c, and the AND circuits 22a through 22c, each shown in FIG. 4, are provided in the I/F sections 2a through 2c, respectively; and the data signals 101a through 101c outputted from the modulation/demodulation circuit 10 and the output level control signals 110a through 110c are supplied to the I/F sections 2a through 2c, respectively.

The description has dealt with a case in which a positive logic is adopted. However, the present invention is not limited to this, i.e., the present invention may be applied to a circuit which operates in accordance with a negative logic. For example, the present invention may be applied to a data transmission apparatus in which the turning off is carried out when a level of "1" is supplied to an I/F section, whereas the turning on is carried out when a level of "0" is supplied to the I/F section.

The description has dealt with (a) a case where the embodiment in which the AND circuits 22a through 22c are added to the embodiment (corresponding to FIG. 4 and FIG. 5) in which the power control signal 102 is supplied to the power source section 3 so as to carry out the power control, and (b) a case where the embodiment in which the three-state buffer circuits 32a through 32c for output-use are added to the embodiment (corresponding to FIG. 6 and FIG. 7), respectively. Note that the provision of AND circuits or three-state buffer circuits ensures the effect of reducing the power consumption in the I/F section(s), without carrying out the foregoing power control.

EXAMPLE

The following description deals with a case where the data transmission apparatus of the above described embodiment is applied to the IEEE Std 1394 serial bus standard.

Figure 11:
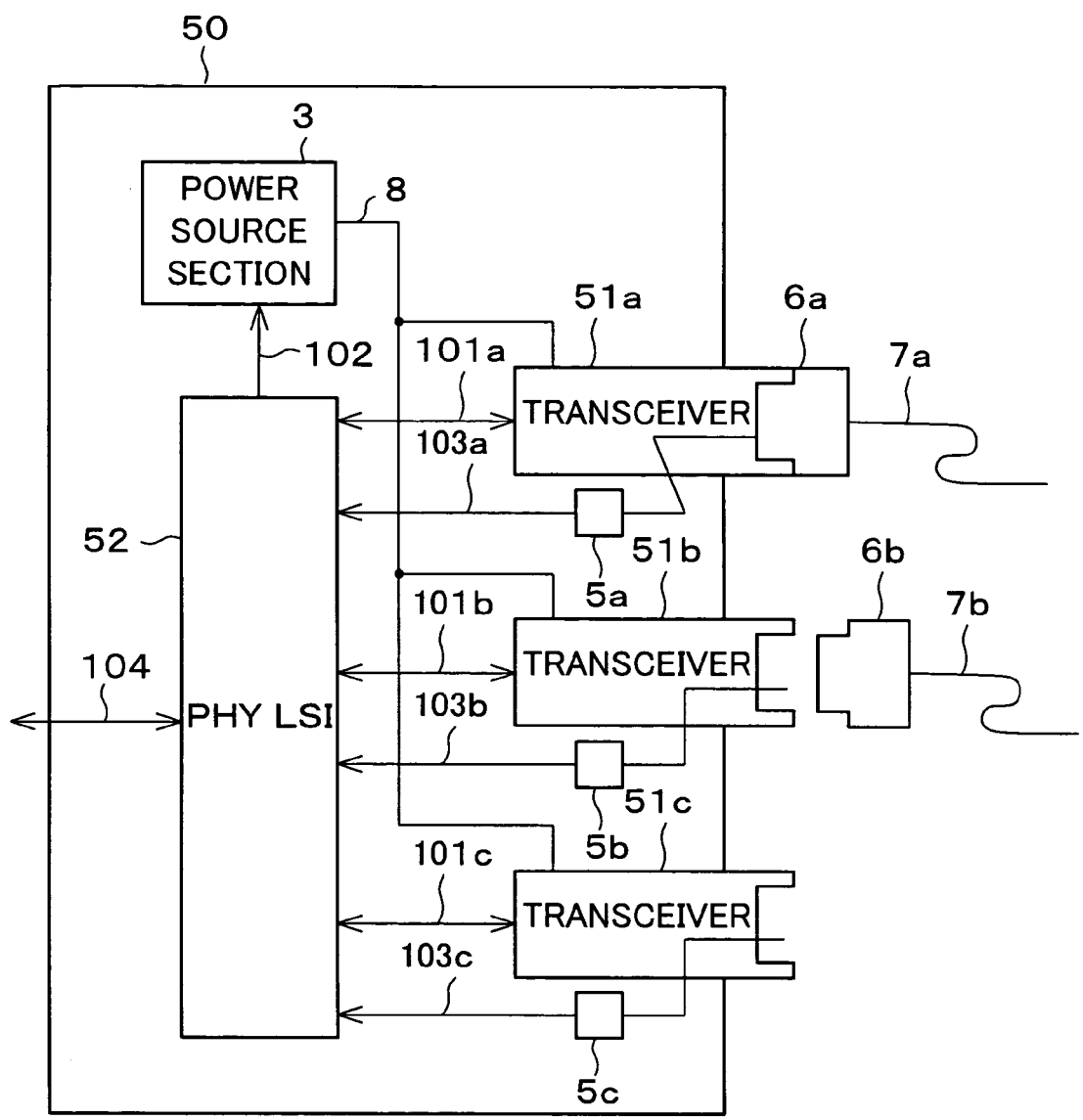
FIG. 11 is a block diagram showing a schematic arrangement of an embodiment which is applied to an IEEE Std 1394 serial bus standard.

FIG. 11 is a block diagram showing a schematic arrangement of a data transmission apparatus 50 which is obtained by applying the data transmission apparatus 1 shown in FIG. 1 to the IEEE Std 1394 serial bus standard. Note that this is merely one example. The IEEE Std 1394 serial bus standard is a communication standard which is used in household electronic appliances such as audiovisual instruments. According to the standard, the link-up is carried out via a tree structure topology, thereby giving rise to the tendency that a single instrument includes a plurality of I/F sections. No instrument main body is adopted because of the realization of the trunk function. This causes the parts involved in the communication of the serial bus to be likely to operate even while no electric power is supplied.

Because of being used in household electronic appliances, the IEEE Std 1394 serial bus standard having the above property is required to reduce power consumption and to reduce production cost. In an OP i. LINK specification that is a standard obtained by extending the IEEE Std 1394 serial bus standard and in an IEEE Std 1394b serial bus standard, a specification for communication with optical fibers 7a and 7b is set up. In these standards, it is required to avoid, during a period in which no communication is carried out, that optical transceivers 51a, 51b, and 51c output coherent light or output high-intensity light so as to avoid damaging human eyes and/or so as to prevent shortening of the lifetime of light emitting devices.

The data transmission apparatus and the control method thereof in accordance with the present invention are in conformity with the above requirements.

In the IEEE Std 1394 serial bus standard, a function corresponding to the control section is referred to as PHY or physical layer. An LSI for realizing the function is referred to as PHY LSI.

According to the IEEE Std 1394 serial bus standard, an interface between a PHY LSI 52 and its higher communication layer is referred to as PHY-LINK interface. A PHY LSI 52 may be replaced with another LSI which is in conformity with the rules of the PHY-LINK interface.

In the data transmission apparatus of the present example, the function on the PHY side of the PHY-LINK interface can be realized by a modulation/demodulation circuit in the PHY LSI 52. The characterizing part of the present invention is realized by a control circuit in the PHY LSI, AND circuits, and three-state buffer circuits for output-use. The constituent components of the present invention do not affect the PHY-LINK interface, accordingly. Therefore, it is possible to apply the data transmission apparatus of the present example to an instrument which is compliant with the existing IEEE Std 1394 serial bus standard.

When each of the control sections in the foregoing embodiments and the above example is constituted by a microcomputer, the way in which the control section controls may be realized by a control program. The control program may be stored in a computer-readable recording medium. According to the present invention, the computer-readable recording medium may be (a) a memory such as a ROM (Read Only Memory) which is built in or is connected with a universal computer so as to be processed by the universal computer or (b) a recording medium from which a program can be read out by loading the recording medium into a program read device that is provided as an external storage device.

In each case, it may be arranged such that the stored program is executed by the access of the microprocessor, or it may be arranged such that a program is executed by reading out the stored program and downloading to a program memory area of a RAM (Random Access Memory) or other memory. Here, it is assumed that the program for the downloading is stored in advance in the apparatus main body.

The program medium is a recording medium which is detachably provided with respect to the main body, and may be a medium, which fixedly carries the program, such as (a) a tape medium such as a magnetic tape or a cassette tape, (b) a disk medium such as (i) a magnetic disk such as a flexible disk or a hard disk or (ii) an optical disk such as CD-ROM/MO/MD/DVD, (c) a card medium such as an IC card (including a memory card) or an optical card, or (d) a semiconductor memory such as a mask ROM, EPROM, EEPROM, or a flash ROM.

The present invention has a system arrangement which can be connected with communication networks including Internet. Like the downloading of a program from a communication network, the present invention may adopt a medium which carries a program. In the case of downloading the program from the communication network, a program for downloading the program may be stored in the apparatus main body or may be installed via another recording medium.

Note that the content of the recording medium is not limited to a program, i.e., the content may be data.

As described above, a control method of a data transmission apparatus in accordance with the present invention, which includes (a) a plurality of I/F sections; (b) a power source section; and (c) detection sections, includes the step of controlling the electric power such that the electric power is supplied to all of the I/F sections from the power source section when the detection sections detect that at least one I/F section is in a connecting state, and such that no electric power is supplied to the I/F sections from the power source section when the detection sections detect that none of the I/F sections is in a connecting state.

With the arrangement, no electric power is supplied to the I/F sections from the power source section when the detection sections detect that none of the I/F sections is in a connecting state. This ensures that the power consumption is reduced, which is an effect derived from the above control method. Further, the provision of a single power source section ensures another effect that the number of the components is reduced compared with the case where the number of power source sections provided is equal to that of the I/F sections provided, for the purpose of reducing the power consumption.

In the control method of the present invention, it is preferable that (i) when the detection sections detect that an I/F section is in a connecting state, and when data is to be transmitted to the external device via the I/F section, the data is controlled so as to be outputted to the I/F, and (ii) when the detection sections detect that the I/F section is not in a connecting state, a signal is controlled so as to be outputted to the I/F section, the signal causing the I/F section to transmit a signal whose output level is a low level.

With the control method, it is controlled such that when the I/F section is in a connecting state and data is to be transmitted to the external device via the I/F section, the data is outputted to the I/F section. This allows the I/F section, which is in a connecting state, to transmit the data to the external device. In contrast, it is controlled such that when the I/F section is not in a connecting state and data is to be transmitted to the external device via the I/F section, a signal is outputted to the I/F section, the signal causing the I/F section to output a signal whose output level is a low level. This causes the output level of the I/F section, which is not in a connecting state, to be lowered, thereby ensuring a reduction of the power consumption.

Accordingly, the following effect is obtained: it is possible to reduce the power consumption with respect to the I/F section that is not in a connecting state, even in a case where the reduction of the power consumption can not be carried out based on the electric power control due to the fact that at least one I/F section is in a connecting state.

In the control method of the present invention, it is preferable to carry out control such that the data to be transmitted to the external device is outputted to a target I/F section when the detection sections detect that at least one I/F section is in a connecting state, and none of the I/F sections receives the data when the detection sections detect that none of the I/F sections is in a connecting state.

With the control method, it is controlled such that when at least one I/F section is in a connecting state, (a) the electric power is supplied to all of the I/F sections and (b) the data to be transmitted to the external device is outputted to a target I/F section. This allows the I/F section which is in a connecting state to transmit the data to the external device. In contrast, it is controlled such that when none of the I/F sections is in a connecting state, (i) the electric power is supplied to none of the I/F sections and (ii) none of the I/F sections receives the data. This ensures that the data is not supplied to the I/F sections to which no electric power is supplied.

Accordingly, the following effect is obtained: it is possible to prevent a breakdown in the internal circuit of the I/F section, a breakdown being likely to occur when the data is supplied to the I/F section to which no electric power is supplied.

In the control method of the present invention, it is preferable that when the data transmission apparatus includes a plurality of power source sections for supplying electric power to the respective interface sections, the controlling of the electric power is changed into an individual power controlling in which the electric power is supplied from the power source sections only to the interface sections that have been detected to be in a connecting state by the detection sections.

With the control method, when the data transmission apparatus includes a single power source section that supplies the electric power to all of the I/F sections, the foregoing electric power control is carried out. In contrast, when the data transmission apparatus includes a plurality of power source sections that supply the electric power to the respective I/F sections, the controlling of the electric power is changed into an individual power controlling in which the electric power is supplied only to the I/F sections that have been detected to be in a connecting state by the detection sections. This ensures the following effect: it is possible to realize a reduction of the power consumption by carrying out the electric power control in accordance with the number of the power source sections.

In the control method of the present invention, it is preferable that when the individual power controlling is carried out, data to be transmitted to the external device is controlled so as to be outputted to the I/F section that has been detected to be in a connecting state by the detection sections, and the data is controlled so as not to be outputted to I/F sections that have been detected not to be in a connecting state by the detection sections.

With the control method, it is controlled such that when the individual power controlling is carried out, (a) no electric power is supplied to the I/F sections which are not in a connecting state and (b) the data is not outputted to the I/F sections which are not in a connecting state. Accordingly, the following effect is obtained: it is possible to prevent a breakdown in the internal circuit of the I/F section, a breakdown being likely to occur when the data is supplied to the I/F section to which no electric power is supplied.

As described above, there is another control method of a data transmission apparatus in accordance with the present invention. According to this method, the apparatus includes: (a) a plurality of I/F sections, each converting a data into a predetermined transmitting format and transmitting it to an external device; and (b) detection sections each detecting whether or not each of the I/F sections is in a connecting state with respect to the external device. The method comprises the step of controlling so as: (i) to output the data to an I/F section, when the detection sections detect that the I/F section is in a connecting state and when data is to be transmitted to the external device via the I/F section, and (ii) to output a signal to the I/F, the signal causing the I/F section to transmit a signal whose output level is a low level, or not to output the data to the I/F section, when the detection sections detect that the I/F section is not in a connecting state.

With the control method, the following effect is obtained: it is possible to reduce the power consumption by causing the I/F section which is not in a connecting state to have a low level or zero, even in a data transmission apparatus which does not carry out the reduction of the power consumption based on the electric power control of the I/F section.

As described above, the present invention includes a data transmission apparatus of a control unit. The data transmission apparatus including: (a) a plurality of I/F sections; (b) a single power source section; (c) a control unit that controls the power source section; and (d) detection sections each detecting whether or not each of the I/F sections is in a connecting state with respect to the external device, and outputting a connecting detection signal to the control unit. The control unit includes a power control section that outputs to the power source section a power control signal for controlling the electric power such that the electric power is supplied to all of the I/F sections from the power source section when the detection sections detect that at least one I/F section is in a connecting state, and such that no electric power is supplied to the I/F sections when the detection sections detect that none of the I/F sections is in a connecting state.

With the arrangement, although only a single power source section is provided, the electric power is supplied from the power source section to none of the I/F sections in accordance with the controlling of the control unit when none of the I/F sections is in a connecting state, thereby obtaining the following effect: it is possible to realize a reduction of the power consumption with few components.

As described above, in a control unit of a data transmission apparatus in accordance with the present invention having the above arrangement, it is preferable to further include an output level control section that carries out controlling in accordance with the connecting detection signals outputted from the detection sections such that: when the detection sections detect that the I/F section is in a connecting state and when data is to be transmitted to the external device via the I/F section, the data is outputted to the I/F section, and when the detection sections detect that the I/F section is not in a connecting state, a signal is outputted to the I/F section, the signal causing the I/F section to transmit a signal whose output level is a low level.

With the arrangement, the control unit controls the outputting of the data to the I/F section in accordance with the connecting detection signal. More specifically, when the I/F section is in a connecting state and data is to be transmitted to the external device via the I/F section, the data is outputted to the I/F section, whereas when the I/F section is not in a connecting state, a signal is outputted to the I/F section, the signal causing the I/F section to output a signal whose output level is a low level.

At this time, in the data transmission apparatus, when the I/F section is in a connecting state and data is to be transmitted to the external device via the I/F section, the data is outputted to the I/F section in accordance with the controlling of the control unit. This allows the I/F section, which is in a connecting state, to transmit the data to the external device. And, in the data transmission apparatus, when the I/F section is not in a connecting state and data is to be transmitted to the external device via the I/F section, a signal is outputted to the I/F section, the signal causing the I/F section to output to the external device a signal whose output level is a low level. This allows the output level of the I/F section, which is not in a connecting state, to be lowered, thereby ensuring the reduction of the power consumption.

Thus, even in a case where it is not possible to carry out the reduction of the power consumption based on the electric power controlling because any of the I/F sections is in a connecting state, the following effect is obtained: it is possible to realize the reduction of the power consumption with respect to the I/F section which is not in a connecting state.

As described above, in the control unit of the present invention, it is preferable to further include an output permission control section that carries out controlling in accordance with the connecting detection signals outputted from the detection sections such that: the data to be transmitted to the external device is outputted to a target I/F section when the detection sections detect that at least one I/F section is in a connecting state, and such that none of the I/F sections receives the data when the detection sections detect that none of the I/F sections is in a connecting state.

With the arrangement, the control unit controls the outputting of the data to the I/F section in accordance with the connecting detection signal. More specifically, when the I/F section is in a connecting state and data is to be supplied to the external device via the I/F section, the data is outputted to the I/F section, whereas when the I/F section is not in a connecting state, the data is not outputted to the I/F section.

At this time, in the data transmission apparatus, when any of the I/F sections is in a connecting state, it is controlled such that (a) the electric power is supplied to all of the I/F sections and (b) the data is outputted to a target I/F section, in accordance with the controlling of the control unit, respectively. This allows the I/F section, which is in a connecting state, to transmit the data to the external device. In contrast, it is controlled such that when none of the I/F sections is in a connecting state, (1) the electric power is supplied to none of the I/F sections and (2) the data is supplied to none of the I/F sections. This ensures that the data is not supplied to the I/F sections to which the electric power is not supplied.

Accordingly, the following effect is obtained: it is possible to prevent a breakdown in the internal circuit of the I/F section, the breakdown being likely to occur when the data is supplied to the I/F section to which no electric power is supplied.

As described above, in the control unit of the present invention, when said data transmission apparatus includes a plurality of power source sections for supplying the electric power to the respective interface sections, it is preferable to further include: (a) an individual power control section that controls the power source sections in accordance with the connecting detection signals such that the electric power is supplied only to the interface sections that have been detected to be in a connecting state by the detection sections; and (b) a switching section that switches from said power control section to said individual power control section.

With the control unit, when the data transmission apparatus includes a single power source section that supplies the electric power to all of the I/F sections, the foregoing electric power control is carried out by the foregoing individual power control section. In contrast, when the data transmission apparatus includes a plurality of power source sections that supply the electric power to the respective I/F sections, the controlling of the electric power is changed by the switching section into an individual power controlling of the individual power control section from the power controlling of the power control section. This ensures that a power control signal is output to each of the power source sections for controlling the power source sections so as to supply the electric power only to the I/F sections which have been detected to be in a connecting state by the detection section.

At this time, in the data transmission apparatus, (a) when the single power source section carries out the power controlling of all of the I/F sections, the power controlling is carried out by the power control section of the control unit and (B) when the power source sections carry out the power controlling of the respective I/F sections, the power controlling is carried out by the individual power control section of the control unit.

Accordingly, the following effect is obtained: it is possible to realize the reduction of the power consumption by carrying out the power controlling in accordance with the number of the power source sections. The control unit can carry out the power control in accordance with the various number of the power source sections. This ensures versatility and the following effect: it is possible to expect efficient mass production.

As described above, in the control unit of the present invention, it is preferable to further include an output control section that controls in accordance with the connecting detection signals outputted from the detection sections such that: data to be transmitted to the external device is outputted to the I/F section that has been detected to be in a connecting state by the detection sections, and the data is not outputted to the I/F section that has been detected not to be in a connecting state by the detection sections.

With the arrangement, it is controlled such that when the individual power controlling is carried out, (a) no electric power is supplied, by controlling of the individual power control section, to the I/F sections which are not in a connecting state and (b) the data is not outputted, by controlling of the output control section to the I/F sections, which are not in a connecting state. Accordingly, the following effect is obtained: it is possible to prevent a breakdown in the internal circuit of the I/F section, the breakdown being likely to occur when data is supplied to the I/F section to which no electric power is supplied.

A data transmission apparatus having a control unit in accordance with the present invention includes: (a) a plurality of I/F sections; (b) a control unit that controls outputting of the data to the I/F sections; and (c) detection sections. The control unit includes: an output control section that controls the outputting of the data in accordance with the connecting detection signal such that: when the detection sections detect that the interface section is in a connecting state and data is to be transmitted to the external device via the I/F section, the data is outputted to the I/F section, and when the detection sections detect that the I/F section is not in a connecting state, (a) a signal is outputted to the I/F section, the signal causing the I/F section to transmit a signal whose output level is a low level, or (b) the data is not outputted to the I/F section.

With the arrangement, even in a data transmission apparatus which does not carry out the reduction of the power consumption based on the power control of the I/F section, it is possible to realize the reduction of the power consumption. This is because the output level of the I/F section which is not in a connecting state becomes a low level or zero in accordance with the controlling of the output control section.

Each of the control units may carry out data communications which are in conformity with IEEE Std 1394 serial bus standard.

As described earlier, a data transmission apparatus in accordance with the present invention, includes: (a) a plurality of I/F sections; (b) at least one power source section; (c) any one of the control units that have been described; and (d) detection sections.

With the arrangement, it is possible to obtain the same effect as the foregoing effect.

It is possible for a computer to carry out the control method of the data transmission apparatus, when a control program corresponding to the control method of the data transmission apparatus is executed by the computer. When the control program of the data transmission apparatus is recorded in a computer-readable recording medium, it is possible for any computer to carry out the control method of the data transmission apparatus.

The specific embodiment and example described in "BEST MODE FOR CARRYING OUT THE INVENTION" are only to clarify technical contents of the present invention. The present invention is therefore not to be interpreted in a narrow sense as being limited by such specific examples. In other words, the present invention may be varied in many ways within the scope of the spirit of the present invention and within the scope of the following claims.

INDUSTRIAL APPLICABILITY

The present invention provides a control method of a data transmission apparatus, a control unit of the data transmission apparatus, the data transmission apparatus, a control program of the data transmission apparatus, and a recording medium in which the control program is recorded each capable of reducing the power consumption of I/F sections in the data transmission apparatus. This ensures the reduction of the power consumption in the data transmission apparatus.

The invention claimed is:

1. A control method of a data transmission apparatus, said apparatus including:
   a plurality of interface sections, each converting a data into a predetermined transmitting format and transmitting it to an external device;
   a power source section that supplies electric power to the respective interface sections; and
   detection sections, each detecting whether or not each of the interface sections is in a connecting state with respect to the external device,
   said control method comprising the step of:
   controlling the electric power such that the electric power is supplied to all of the interface sections from the power source section when the detection sections detect that at least one interface section is in a connecting state, and such that no electric power is supplied to the interface sections from the power source section when the detection sections detect that none of the interface sections is in a connecting state, wherein:
   when the detection sections detect that an interface section is in a connecting state when transmitting a data to the external device via the interface section, the data is controlled so as to be outputted to the interface section, and
   when the detection sections detect that the interface section is not in a connecting state, a signal is controlled so as to be outputted to the interface section, the signal causing the output of the interface section to be a fixed level.

2. The control method as set forth in claim 1, wherein:
   when the detection sections detect that the interface section is not in a connecting state, a signal is controlled so as to be outputted to the interface section, the signal causing the output of the interface section to be fixed at a low level.

3. A control method of a data transmission apparatus, said apparatus including:
   a plurality of interface sections, each converting a data into a predetermined transmitting format and transmitting it to an external device;
   a power source section that supplies electric power to the respective interface sections; and
   detection sections, each detecting whether or not each of the interface sections is in a connecting state with respect to the external device,
   said control method comprising:
   controlling the electric power such that the electric power is supplied to all of the interface sections from the power source section when the detection sections detect that at least one interface section is in a connecting state, and such that no electric power is supplied to the interface sections from the power source section when the detection sections detect that none of the interface sections is in a connecting state, wherein:

the data to be transmitted to the external device is controlled so as not to be outputted to the interface section to which the electric power is not supplied in accordance with the controlling of the electric power.

4. The control method as set forth in claim 1, wherein:
when said data transmission apparatus includes a plurality of power source sections for supplying the electric power to the respective interface sections, the controlling of the electric power is changed into an individual power controlling in which the electric power is supplied from the power source sections only to the interface sections that have been detected to be in a connecting state by said detection sections.

5. The control method as set forth in claim 4, wherein:
the data to be transmitted to the external device is controlled so as not to be outputted to the interface section to which the electric power is not supplied in accordance with the individual power controlling.

6. A control method of a data transmission apparatus, said apparatus including:
a plurality of interface sections, each for converting a data into a predetermined transmitting format and transmitting it to an external device; and
detection sections each detecting whether or not a corresponding interface section is in a connecting state with respect to the external device,
said control method comprising the step of controlling so as:
to output the data to an interface section, when the data is to be transmitted to the external device via the interface section and the detection sections detect that the interface section is in a connecting state, and
(a) to output a signal to the interface section, the signal causing the interface section to transmit a signal whose output level is a low level, or (b) not to output the data to the interface section, when the detection sections detect that the interface section is not in a connecting state.

7. A control unit of a data transmission apparatus,
said data transmission apparatus, comprising:
a plurality of interface sections, each converting a data into a predetermined transmitting format and transmitting it to an external device;
a power source section that supplies electric power to the respective interface sections;
a control unit that controls the power source section; and
detection sections each detecting whether or not each of the interface sections is in a connecting state with respect to the external device, and outputting a connecting detection signal to the control unit; and
said control unit, comprising:
a power control section that outputs to said power source section a power control signal for controlling the electric power (i) such that the electric power is supplied to all of the interface sections from the power source section when the detection sections detect that at least one interface section is in a connecting state, and (ii) such that no electric power is supplied to the interface sections when the detection sections detect that none of the interface sections is in a connecting state,
further comprising an output level control section that carries out controlling in accordance with the connecting detection signals outputted from said detection sections such that:
when the detection sections detect that the interface section is in a connecting state when transmitting a data to the external device via the interface section, the data is outputted to the interface section, and
when the detection sections detect that the interface section is not in a connecting state, a signal is outputted to the interface section, the signal causing the output of the interface section to be a fixed level.

8. The control unit as set forth in claim 7, wherein said output level control section carries out controlling in accordance with the connecting detection signals outputted from said detection sections such that:
when the detection sections detect that the interface section is not in a connecting state, a signal is outputted to the interface section, the signal causing the output of the interface section to be fixed at a low level.

9. A control unit of a data transmission apparatus,
said data transmission apparatus, comprising:
a plurality of interface sections, each converting a data into a predetermined transmitting format and transmitting it to an external device;
a power source section that supplies electric power to the respective interface sections;
a control unit that controls the power source section; and
detection sections each detecting whether or not each of the interface sections is in a connecting state with respect to the external device, and outputting a connecting detection signal to the control unit; and
said control unit, comprising:
a power control section that outputs to said power source section a power control signal for controlling the electric power (i) such that the electric power is supplied to all of the interface sections from the power source section when the detection sections detect that at least one interface section is in a connecting state, and (ii) such that no electric power is supplied to the interface sections when the detection sections detect that none of the interface sections is in a connecting state, said data transmission apparatus further comprising:
an output permission control section that controls the data, which is to be transmitted to the external device, so as not to be outputted to an interface section of said plurality of interface sections to which electric power is not supplied in accordance with the controlling of the power control section.

10. The control unit as set forth in claim 7, further comprising, when said data transmission apparatus includes a plurality of power source sections for supplying the electric power to the respective interface sections:
an individual power control section that controls said power source sections in accordance with the connecting detection signals such that the electric power is supplied only to the interface sections that have been detected to be in a connecting state by said detection sections; and
a switching section that switches from said power control section to said individual power control section.

11. The control unit as set forth in claim 10, further comprising:
an output control section that controls the data, which is to be transmitted to the external device, so as not to be outputted to the interface section to which the electric power is not supplied in accordance with the controlling of the individual power control section.

12. A control unit of a data transmission apparatus,
said data transmission apparatus, comprising:
a plurality of interface sections, each for converting a data into a predetermined transmitting format and transmitting it to an external device;

a control unit that controls outputting of the data to the interface sections; and detection sections, each detecting whether or not a corresponding interface section is in a connecting state with respect to the external device, and outputting a connecting detection signal to the control unit;

said control unit, comprising:

an output control section that controls the outputting of the data in accordance with the connecting detection signal such that:

when the detection sections detect that the interface section is in a connecting state when transmitting a data to the external device via the interface section, the data is outputted to the interface section, and when the detection sections detect that the interface section is not in a connecting state, (i) a signal is outputted to the interface section, the signal causing the interface section to transmit a signal whose output level is a low level, or (ii) the data is not outputted to the interface section.

13. The control unit as set forth in claim 7, 8, 10, 11, or 12, wherein said control unit carries out data communications which are in conformity with IEEE Std 1394 serial bus standard.

14. A data transmission apparatus, comprising:

a plurality of interface sections, each converting a data into a predetermined transmitting format and transmitting it to an external device;

at least one power source section that supplies electric power to the interface sections;

a control unit recited in claim 7, 8, 10, 11, or 12; and detection sections, each detecting whether or not each of the interface sections is in a connecting state with respect to the external device, and outputting a connecting detection signal to the control unit.

15. A control program of a data transmission apparatus causing a computer to carry out the control method recited in claim 1, 2, 4, 5, or 6.

16. A computer-readable recording medium in which the control program as set forth in claim 15 is recorded.

* * * * *